United States Patent
Mokhtari et al.

(10) Patent No.: US 10,432,741 B2
(45) Date of Patent: Oct. 1, 2019

(54) SYSTEMS AND METHODS FOR GUARANTEEING DELIVERY OF PUSHED DATA TO REMOTE CLIENTS

(71) Applicant: Open Access Technology International, Inc., Minneapolis, MN (US)

(72) Inventors: Sasan Mokhtari, Eden Prairie, MN (US); Ilya William Slutsker, Plymouth, MN (US); Abhimanyu Thakur, Maple Grove, MN (US); Carlos Gonzalez-Perez, Maple Grove, MN (US)

(73) Assignee: Open Access Technology International, Inc., Minneapolis, MN (US)

( * ) Notice: Subject to any disclaimer, the term of this patent is extended or adjusted under 35 U.S.C. 154(b) by 288 days.

(21) Appl. No.: 15/080,115

(22) Filed: Mar. 24, 2016

(65) Prior Publication Data

US 2016/0285986 A1 Sep. 29, 2016

Related U.S. Application Data

(60) Provisional application No. 62/138,131, filed on Mar. 25, 2015.

(51) Int. Cl.
*G06F 13/00* (2006.01)
*H04L 29/08* (2006.01)
*H04W 56/00* (2009.01)
*H04L 12/841* (2013.01)

(52) U.S. Cl.
CPC .............. *H04L 67/26* (2013.01); *H04L 47/28* (2013.01); *H04W 56/0015* (2013.01)

(58) Field of Classification Search
CPC .... H04L 67/26; H04L 47/28; H04W 56/0015; G06Q 10/10
USPC ................................ 709/206, 203, 217–219
See application file for complete search history.

(56) References Cited

U.S. PATENT DOCUMENTS

| | | | | |
|---|---|---|---|---|
| 7,266,365 | B2 * | 9/2007 | Ferguson | G06Q 10/107 455/412.1 |
| 9,819,548 | B2 * | 11/2017 | Donner | H04L 41/0886 |
| 2005/0148356 | A1 | 7/2005 | Ferguson et al. | |
| 2010/0250670 | A1 | 9/2010 | Wei | |
| 2014/0047078 | A1 * | 2/2014 | Wilson | H04L 67/26 709/219 |
| 2014/0215028 | A1 | 7/2014 | Donner et al. | |
| 2018/0123988 | A1 * | 5/2018 | McLeod | H04L 67/26 |

* cited by examiner

Primary Examiner — Kenneth R Coulter
(74) Attorney, Agent, or Firm — Vidas Arrett & Steinkraus P.A.

(57) ABSTRACT

Systems and methods are provided, which provide for validation of message delivery utilizing push functionality. Such systems and methods expedite delivery of data while utilizing reliable periodic pull to validate message delivery by querying a group or groups of recipients. The invention may then receive responses from execution of periodic pull functionality and initiate known tasks or preconfigured actions in accordance with any particular response received or not received.

20 Claims, 1 Drawing Sheet

SYSTEMS AND METHODS FOR GUARANTEEING DELIVERY OF PUSHED DATA TO REMOTE CLIENTS

CROSS-REFERENCE TO RELATED APPLICATIONS

This application claims priority to U.S. Provisional patent application no. 62/138,131 filed Mar. 25, 2015, the entire content of which is hereby incorporated by reference.

STATEMENT REGARDING FEDERALLY SPONSORED RESEARCH

Not Applicable.

FIELD OF THE INVENTION

The present disclosure relates generally to communications transacted between a server and a consumer, more particularly, to guaranteeing delivery of pushed data via periodic pull.

BACKGROUND OF THE INVENTION

In many software applications utilizing network communications, key functionality or information is deployed onto a publisher, frequently a computer data publishing source, and users communicate with the data publishing source via various consumer devices such as computers, cell phones, and tablets among other such devices. New events and data changes are processed on the data publishing source and communicated to the consumer devices using various methods with varying degrees of delivery reliability. Modern forms of communications are usually subdivided into two main types: pull or get technology services, where a consumer periodically initiates requests to a data publishing source (i.e. pulling for data), inquiring as to whether new information is available, and push technology services, where a data publishing source initiates the sending of new events from the data publishing source to those consumers that have the right as well as need to receive such updates (i.e. message broadcast to consumers subscribed to receive such messages from the data publishing source).

Respectively, each of these types of communications, when used individually, has serious drawbacks in some mission critical applications. The pull for data provides the reliability of updates including the guarantee of delivery but at the cost of update latency, since a built-in time delay in consumer requests for updates is typically present. In addition, the pull increases utilization of often limited computer network resources, forcing data publishing sources to do wasteful work responding to queries when there was no changes in data. In cases where thousands of consumers are bombarding the data publishing source with periodic requests, this inefficiency will result in a significant data publishing source load. In contrast, the push method, while providing the instantaneous event notification only when there are actual data changes, is not reliable by definition since both consumer and data publishing source may not be not be aware of lost messages. Some approaches that provide a delivery confirmation to the data publishing source with subsequent re-deliveries have not been reliable due to the increased complexity and vulnerability of massive re-deliveries cycles that tend to clog the delivery network in cases of persistent communication failures.

In many applications currently utilized in the art, consumers stay synchronized with the data publishing source in a push or a pull but not both.

In such application known in the art, the consumer(s) periodically and repeatedly requests the data publishing source to check whether the data publishing source has any new messages for a consumer. This periodic polling from a large number of consumers to the data publishing source induced a very heavy load of unnecessary requests to be processed. In a majority of events, the data publishing source may not even have any data for the consumer but the consumer inefficiently re-loads the data nonetheless.

Another complication that this scheme introduces is that the data are not available in real-time. The consumer has to wait for the next iteration of the periodic pull to receive any messages that may have been generated. In a time-sensitive application, this can introduce delays and cause various negative impacts.

In another application known in the art, a data publishing source may be pushing the data in real-time to the consumer. In this scheme the data publishing source sends the message to the consumers in a send and forget fashion. A significant complication that arises with this mechanism is that reliability is compromised. The real-time push based mechanisms are built on the foundation of persisted channels between the consumer and the data publishing source, which allow the data publishing source to send any message to the consumer when available. This persistent channel can be compromised due to any number of events both known and unknown in the art, leaving the consumer out of sync with the data publishing source.

BRIEF SUMMARY OF THE INVENTION

In general, this disclosure is directed toward guaranteed delivery of pushed data to remote consumers via periodic pull requests. The invention described in this application, which is referred to as push-pull, solves reliability problems while remaining efficient on data publishing sources and network traffic by combining both methods into a single mechanism that has the advantages of both schemes while mitigating their drawbacks. The push is the dominant method under normal routine conditions and is used to instantaneously deliver indexed or numbered messages to each consumer. The consumer has the ability to monitor the arriving message, track their numbering and, upon detecting delays, interruptions, or out of order deliveries, interrogate the data publishing source about missing payloads. Depending on the data publishing source's answer, the consumer may decide to wait for missing messages, request a full refresh of the data profile from the data publishing source, or even switch to a full-pledged data pull mode. The push-pull approach, therefore, combines the benefits of fast notification and low data publishing source load of the push method with the ability to switch to a slower but more reliable pull method in cases of network or data publishing source stress or malfunction.

The details of one or more aspects of the disclosure are set forth in the accompanying drawings and the description below. Other features, objects, and advantages will be apparent from the description and drawings that are summarized in the claims.

DETAILED DESCRIPTION OF THE INVENTION

Figure 1:
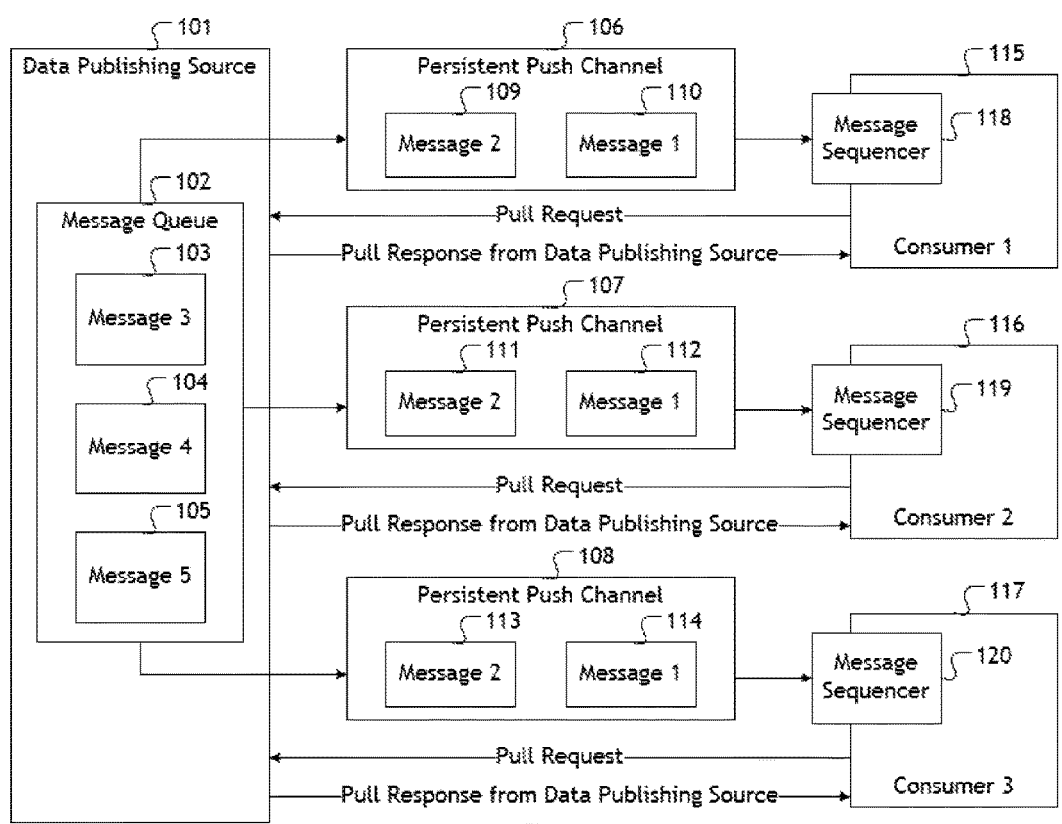
FIG. 1 is a diagram illustrating the designed system operation and the technology utilized in the designed system.

While this invention may be embodied in many forms, there are specific embodiments of the invention described in detail herein. This description is an exemplification of the principles of the invention and is not intended to limit the invention to the particular embodiments illustrated.

Referring to FIG. 1 and in general, this disclosure is directed toward guaranteed delivery of data from a data publishing source 101 to remote consumers 115, 116, 117.

The invention provides a hybrid approach that combines the push protocol with the periodic pull in a sophisticated manner to ensure reliability of delivery while avoiding the heavy load on the data publishing source 101 to process re-load data requests from the consumers 115, 116, 117.

The data publishing source 101 manages the messages 103, 104, and 105 being received for delivery in a message queue 102 and, before handing it to the persistent push channel 106, 107, and 108 for a specific consumer 115, 116, or 117, the data publishing source 101 associates a message identifier and a timestamp associated to the message 103, 104, and 105 being delivered. In preferred embodiments, the message identifiers are capable of incremental iteration by whole number values, such as sequential numbering. The data publishing source 101 maintains this information for each consumer 115, 116, or 117 which provides insight on the last message identifier sent to the consumer 115, 116, or 117 and the timestamp when the data publishing source 101 had handed it to the delivery channel. Each time a new message 109 or 110 is received for the same consumer 115, 116, or 117 the message identifier of the last message sent to that consumer 115, 116, or 117 is sequentially increased by one iteration and then associated to the new message before being sent to the consumer 115, 116, or 117. This ensures the delivery of messages from data publishing source 101 to consumer 115, 116, or 117 in a sequential pattern.

The consumer 115, 116, or 117 receives the message and before processing, it also saves the message identifier and the timestamp associated to its reception. The sequential delivery mechanism provides the ability for the consumer 115, 116, or 117 to know what message identifier will be delivered next. The consumer 115, 116, or 117 uses the pull request/response mechanism to do a periodic pull to the data publishing source 101 by sending the consumer's 115, 116, or 117 last received message identifier and the timestamp. The data publishing source 101 does a quick check to verify this information against the last message identifier sent and the timestamp stored by the data publishing source 101 for that consumer 115, 116, or 117. If the data publishing source 101 finds this information to be synchronized it notifies the consumer 115, 116, or 117 to take no further action. But if the data publishing source 101 identifies that the consumer 115, 116, or 117 is not synchronized then the consumer 115, 116, or 117 is notified to initiate synchronization activities, which in some embodiments can include requests for specific missed messages or sequence of messages. Also in order to handle the situation where the messages are already on their way for delivery on the persistent push channel 106, 107, and 108 but the consumer 115, 116, or 117 receives a not-synchronized pull response from the data publishing source 101, the consumer 115, 116, or 117 maintains a threshold time (T1) that determines how long to wait for actual delivery of the message before initiating said synchronization activities. If this threshold T1 expires and the consumer 115, 116, or 117 has still not received the messages that were in the pipeline then the consumer 115, 116, or 117 will initiate synchronization activities and any future delivery of the outdated messages will be subsequently ignored on the consumer 115, 116, or 117.

In another embodiment, a message may be delivered out of sequence. The consumer 115, 116, or 117 may receive messages with message identifiers M1 and M2 but then receive message M4 before receiving M3. In such an embodiment, the invention allows the consumer 115, 116, or 117 to know that there is a sequence violation in the delivery. This is a common scenario that can arise due to the slow processing time of that message or a failure in the delivery of the message. Upon detection of such a validation error, the consumer 115, 116, or 117 may initiate synchronization activities.

In another embodiment, a large burst of messages may be received on the data publishing source 101 for delivery to the consumer 115, 116, or 117 in a short period of time. In such an embodiment, even with sequential delivery, some messages may get processed faster than others ahead in the pipeline and cause sequential delivery inconsistencies. The failure in delivery of a message could occur either due to temporary disconnection of the persistent push channel 106, 107, and 108 or any other error on the data publishing source 101. To better handle this scenario, the consumer 115, 116, or 117 maintains a message sequencer 118, 119, 120. It is the message sequencer 118, 119, 120 that maintains the last received message identifier and timestamp information on the consumer 115, 116, or 117. When the sequencer 118, 119, 120 identifies a message that is received out of sequence, it saves that message in a buffer. The sequencer 118, 119, 120 then waits for a small threshold time to receive any messages that were supposed to be delivered before the message sitting in the buffer. If these messages are received before the threshold time expires, then the sequencer 118, 119, 120 re-organizes their sequence in the correct order and forwards them for the actual processing on the consumer 115, 116, or 117. Although, if this threshold expires and the sequencer 118, 119, 120 does not receive the expected messages then sequencer 118, 119, 120 raises a request to initiate synchronization activities, which in some embodiments include a pull request to re-synchronize the consumer 115, 116, or 117 with the data publishing source 101.

In some particular embodiments wherein the invention is comprised of computer software, the invention may further utilize encryption enabling software, such as but not necessarily limited to digital certificates, to secure access to the system and encrypt communications sent to and from components within the inventive system and method. Using any number of methods known in the art, the invention may require and validate for the presence of specific encryption enabling software as a login credential. In preferred embodiments, such encryption enabling software is associated on a one-to-one basis with a particular user account. Login to the system of such embodiment would be denied unless the system validates, using any method known in the art, that a user's request to access the system includes the correctly corresponding login credentials comprising of username, password, and encryption enabling software, among others, associated with a particular predefined user account. Moreover, in other embodiments, encryption enabling software may be utilized to encrypt data communications within the invention, such as messages 109, 110 between the data publishing source 101 and consumers 115, 116, and 117.

Using any method known in the art, encryption enabling software can be incorporated into the invention such that messages 109, 110 are encrypted upon sending and then decrypted upon receipt. Such encryption can be accomplished using any known means available in the art. As a non-limiting example, in certain embodiments, the invention may comprise of computer software located on a data publishing source 101 and any of consumer 115 devices. The data publishing source 101 and consumer 115 can be set up with encryption enabling software, such as but not necessarily limited to digital certificates, to facilitate the encryption of communication sent between a data publishing source 101 and a consumer 115. Messages 109, 110 sent between a data publishing source 101 and a consumer 115 may be encrypted during transmission using a data publishing source's 101 encryption enabling software and subsequently decrypted by the consumer's 115 encryption enabling software. Such pre-incorporation of encryption enabling software by both the sending and recipient components ensures that any intercepted communications cannot be read, thus raising the confidence level of transactions occurring within the system as a whole.

The invention claimed is:

1. A system for the guaranteed delivery of data to remote consumers, comprised of
    a data publishing source managing messages within a message queue,
    a message identifier associated to each message and thereafter retained by the data publishing source,
    a persistent push channel through which said messages can be sent,
    a consumer which receives messages and associated message identifier,
    a messaging sequencer facilitating the identification of said message identifier of said messages received by a consumer,
    a periodic pull request from the consumer to the data publishing source comprised of the last message identifier received by the consumer,
    a validation performed by the data publishing source comparing the message identifier sent by the consumer as part of said periodic pull request against the last message identifier sent by the data publishing source.

2. The system of claim 1, wherein an instruction to initiate synchronization activities is returned to said consumer by said data publishing source when a validation error is detected.

3. The system of claim 1, wherein an instruction to take no further action is returned to said consumer by said data publishing source when a validation error is detected.

4. The system of claim 1, wherein the data publishing source associates said message identifier and a timestamp to messages.

5. The system of claim 1, wherein said data publishing source associates a timestamp with each message in addition to said message identifier.

6. The system of claim 1, wherein the messaging sequencer initiatives a request for messages identified as missed by a consumer.

7. The system of claim 1, wherein the data publishing source notifies consumer to initiate synchronization activities when said validation performed by said data publishing source identifies the consumer sent message identifier to be out of synchronization with the message identifier last sent from the data publishing source.

8. The system of claim 1, wherein said consumer utilizes a threshold time to determine how long the consumer will wait for actual delivery of a message before initiating synchronization activities.

9. The system of claim 1, wherein said message sequencer reorganizes messages into correct sequence when out of order delivery is identified.

10. The system of claim 1, wherein said encryption enabling software is utilized to encrypt messages while in transit between said data publishing source and said consumer or said consumer and said data publishing source.

11. A method for guaranteed delivery of data to remote consumers, comprising the following steps:
    a data publishing source manages messages within a message queue,
    a message identifier is associated to each message and thereafter retained by the data publishing source,
    said messages are sent through persistent push channel,
    said messages and associated message identifier are received by a consumer,
    a messaging sequencer facilitates the identification of message identifier of messages received by a consumer,
    a periodic pull request is made from the consumer to the data publishing source comprised of the last message identifier received by the consumer,
    a validation is performed by the data publishing source comparing the message identifier sent by the consumer as part of said periodic pull request against the last message identifier sent by the data publishing source.

12. The method of claim 11, wherein an instruction to initiate synchronization activities is returned to said consumer by said data publishing source when a validation error is detected.

13. The method of claim 11, wherein an instruction to take no further action is returned to said consumer by said data publishing source when a validation error is detected.

14. The method of claim 11, wherein the data publishing source associates said message identifier and a timestamp to messages.

15. The method of claim 11, wherein said data publishing source associates a timestamp with each message in addition to said message identifier.

16. The method of claim 11, wherein the messaging sequencer initiatives a request for messages identified as missed by a consumer.

17. The method of claim 11, wherein the data publishing source notifies consumer to initiate synchronization activities when said validation performed by said data publishing source identifies the consumer sent message identifier to be out of synchronization with the message identifier last sent from the data publishing source.

18. The method of claim 11, wherein said consumer utilizes a threshold time to determine how long the consumer will wait for actual delivery of a message before initiating synchronization activities.

19. The method of claim 11, wherein said message sequencer reorganizes messages into correct sequence when out of order delivery is identified.

20. The method of claim 11, wherein said encryption enabling software is utilized to encrypt messages while in transit between said data publishing source and said consumer or said consumer and said data publishing source.

* * * * *